Nov. 9, 1971  M. H. GRANGER, SR  3,618,255
FISHING PLUG
Filed March 3, 1970

Millard H. Granger, Sr.
INVENTOR.

BY Clarence A. O'Brien
and Harvey B. Jacobson
Attorneys

United States Patent Office 3,618,255
Patented Nov. 9, 1971

3,618,255
FISHING PLUG
Millard H. Granger, Sr., 74 Post St.,
Newport News, Va. 23601
Filed Mar. 3, 1970, Ser. No. 15,976
Int. Cl. A01k 85/00
U.S. Cl. 43—42.42          9 Claims

ABSTRACT OF THE DISCLOSURE

A buoyant plug having a line attaching eye at its forward or leading end and having its rearward or trailing end bifurcated. The bifurcated end provides a pair of furcations and an intervening vertical kerf or notch which opens through the dorsal and ventral surfaces, respectively, and has an oblique angled stop shoulder. The furcations serve to mount a bellcrank whose upper arm has its rear end pivotally linked to the shank of a treble hook. The rounded terminal end of the lower arm provides a cam, which serves as a trigger when contacting obstructions and trips the upper arm and hook, whereby the then suspended hook can clear the obstructions and thereafter return to its normal position.

---

This invention relates to artificial fishing lures, for example, to lures such as embody a specially mounted hook which is automatically tripped to assume a position capable of clearing and by-passing relatively stationary obstructions and pertains, more particularly, to a plug whose rearward or trailing end has novel means for mounting and controlling the anti-snagging hook.

An object of the present invention, generally stated, is to improve upon top water lures which are provided with facilities which minimize the likelihood of the fishhook from snagging and lodging itself in an uncontrollable position on floating logs, debris and similar obstructions. As indicative of the general state of the art to which the invention relates reference can be made, if so desired, to the anti-snagging device disclosed in a patent to Talbert, 2,874,509, and a similarly performing artificial fishing lure shown in the Steehn Pat. 3,253,363.

As will be hereinafter more clearly apparent the invention herein disclosed has to do with a fishing plug which is an innovation in that it is simple, practical, strong and durable, efficient in operation and well serves the purposes for which it has been devised and successfully used.

Briefly the invention comprises an elongated plug having suitable line attaching means at its forward or leading end, the rearward end portion being bifurcated and providing a pair of opposed parallel furcations and an intervening notch. These furcations and the notch serve to accommodate a simple and feasible bellcrank. The bellcrank embodies a pair of coplanar angularly related top and bottom arms. The inward junctional ends of the arms are sheathed and pivotally mounted between the furcations. An edge of the upper arm is adapted to abut a portion of the shoulder between the furcations. The lower arm has a free end which provides a trippable trigger. The shank of the fishhook is linked to an apertured end of the upper arm in a manner to achieve the end result desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
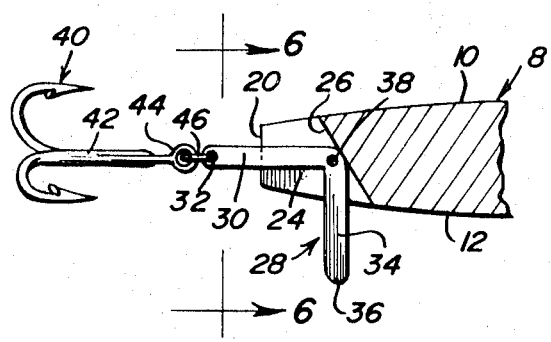
FIG. 4 is a fragmentary detail view with the rear bifurcated end appearing in section and the bellcrank and hook appearing in elevation in normal fishing relationship.
Figure 6:
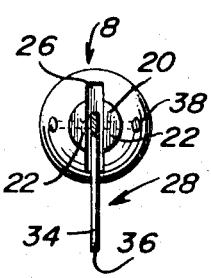

And FIG. 6 is a section taken approximately on the plane of the line 6—6 of FIG. 4, looking in the direction of the indicating arrows.

Figure 2:
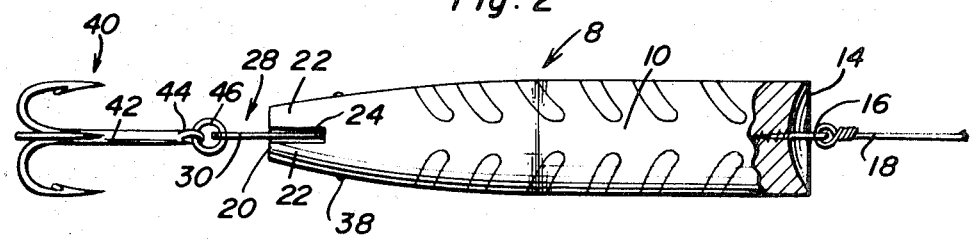
FIG. 2 is a top plan view of the same with the forward portion broken away and appearing in section.

The lure, more specifically, comprises a plug which is denoted by the numeral 8 and is of requisite shape and is suitably and attractively decorated. The top or dorsal surface is denoted at 10 and the bottom or ventral surface at 12. The forward or leading end is denoted at 14 and is dished as shown in FIG. 2 and is provided with an attached eye 16 to which an end of the fishing line 18 is connected. The tapering rearward or trailing end is denoted at 20 and as stated is bifurcated. The two furcations thus defined are denoted at 22 and are alike in construction. The intervening notch or kerf is denoted at 24 and is vertically disposed, that is opens through the top and bottom surfaces 8 and 12. This notch is of requisite length and dimension and the closed forward end portion is oblique angled as denoted at 26 and provides a limit stop shoulder. The surface can be said to incline upwardly and rearwardly or, conversely, downwardly and forwardly. This notched shouldered construction serves to accommodate a simple one piece articulating joint which is here referred to, more specifically, as a bellcrank 28. The bellcrank comprises a pair of companion flat-faced arms the upper one of which is denoted at 30 and is provided with an aperture 32 at its terminal or rearward end. The other arm is designated as the lower arm 34 and has a rounded free terminal end which constitutes a cam 36 when it comes into play in the manner shown in FIG. 5. The rounded corner at the juncture or inner ends of the arms 30 and 34 is situated in the notch and a pivot pin 38 is passed therethrough and through the furcations in the manner shown to provide the bellcrank operating and control result evident by comparing FIGS. 4 and 5 with each other.

Figure 1:
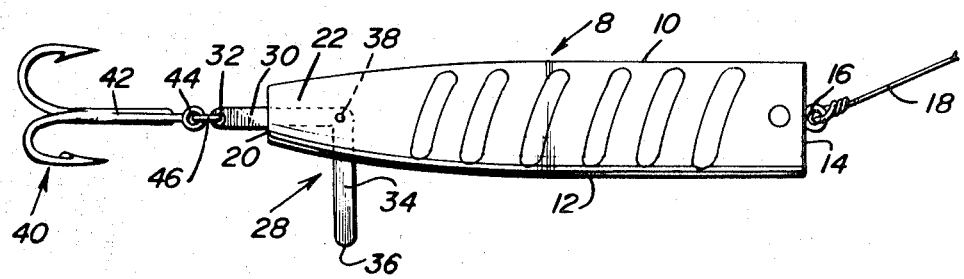
FIG. 1 is a view in side elevation of a fishing plug constructed in accordance with the invention and showing the bellcrank and fishhook in normal fishing relationship.
Figure 5:
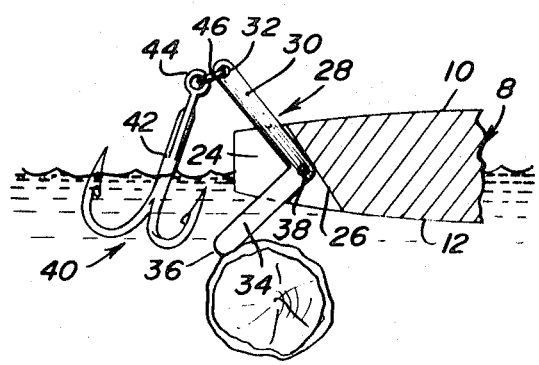
FIG. 5 is a view similar to and based on FIG. 4 and showing the lower trigger arm engaging a rock or similar obstruction and illustrating how the upper arm is tripped to assume an upwardly rearwardly inclined position and to suspend the proportional treble hook in its log clearing position.
Figure 3:
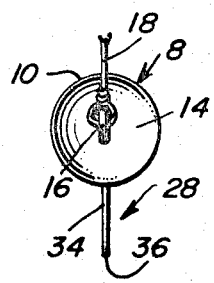
FIG. 3 is an end view observing the forward end of FIG. 2 looking in the direction from right to left.

The treble fishhook is denoted at 40 and has a shank 42 terminating in an eye 44 which serves to accommodate a split linking ring 46. This ring is operatively connected with the apertured end portion 32 of the arm 30 as is evident from the various views of the drawing. It follows that the bellcrank 28 is characterized by a pair of coplanar angularly related top and bottom arms 30 and 34 (also referred to as upper and lower arms), the inward junctional ends being not only pivoted but sheathed in the notch at the central or median portion of the inclined limit stop shoulder 26. All of the views except FIG. 5 show the component parts, that is the bellcrank and fishhook in normal fishing relationship relative to the fishing plug 8. Accordingly it will be evident that when the lower arm comes into contact with an obstruction as illustrated in FIG. 5 it functions as a trigger and serves to trip the upper arm whereby it swings upwardly to the oblique angled position illustrated in FIG. 5. It follows that the linked treble hook assumes the then suspended position illustrated whereby it is then capable of riding or gliding over obstructions such as logs, debris, rocks and analogous obstructions. When the plug and hook clear the obstruction, the hook drops down to its normal fishing position as shown for example in FIGS. 1 and 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An artificial fishing device comprising a lure having leading and trailing ends, said leading end having means for attachment of a fishing line thereto, a fishhook having a shank, and articulating and jointing means carried by said trailing end having a first component arm rearwardly extending and which is pivotally connected with the shank at the rearward end of said arm, and a second component arm rigidly extending downwardly from a forward portion of said first arm and which is adapted to contact and ride over and beyond floating logs, debris and similar obstructions in a manner to enable the fishhook to clear and pass over the same, whereby to minimize the likelihood of hook-snagging difficulties.

2. The fishing device defined in claim 1, and wherein said lure comprises an elongated plug, the means on the leading end thereof comprising an axially attached eye to which an end of the fishing line is connected.

3. The fishing device defined in claim 1, and wherein said first component arm is rigid and having a forward end pivotally connected to said trailing end and its rearward end detachably and pivotally linked to said shank.

4. The fishing device defined in claim 3, and wherein said second component arm also is rigid and which is coplanar with the aforementioned arm and is disposed at an angle thereto and has one end joined to said forward pivotally connected end and its other end free and rounded to function as an obstruction contacting cam.

5. The fishing device defined in claim 1, and wherein said lure comprises an elongated surface-ornamented plug, the trailing end of said plug being bifurcated and the resulting furcations defining an intervening open-ended notch in which the coacting first and second component arms of said jointing means are partially sheathed and cooperatively mounted for predetermined operation.

6. An artificial fishing device comprising an elongated plug constituting a lure and having a body portion and forward and rearward end portions, said forward end portion being provided with an axially mounted eye for a fishing line, the rearward end portion being bifurcated and providing a pair of opposed spaced parallel furcations and a notch between said furcations, the rearward open end of said notch opening through the rearward end of said plug, the closed forward end of said notch providing a stop shoulder, a bellcrank embodying a pair of coplanar angularly related upper and lower arms having their inward junctional ends sheathed and pivotally mounted between said furcations, the pivot point being adjacent a median portion of said stop shoulder and an edge of said upper arm being adapted to abut a portion of said shoulder, said lower arm having a free end which provides a trippable trigger and is adapted to come into contact with and ride over obstructions such as floating logs, debris, and the like, a fishhook having a shank, and means operatively connecting a forward end of said shank to a rearward end of said upper arm.

7. The artificial fishing device defined in and according to claim 6, and wherein the forward end of said shank has an eye provided with a detachably and movably connected split-type linking ring, said ring being operatively linked to an apertured free rearward end portion of said upper arm.

8. The artificial fishing device defined in and according to claim 6, and wherein said shoulder is disposed at an angle which is oblique to the lengthwise axis of said plug and is accordingly inclined upwardly and rearwardly in a manner to limit the lifting movement of said upper arm and the attached oriented fishhook.

9. The artificial fishing device defined in claim 8, and wherein said upper and lower arms are similar in length and proportional to the length of said shank, and wherein the free lower end of the lower arm is rounded to provide an obstruction contacting cam, and wherein when said cam comes into play, the bellcrank functions to lift the fishhook to a suspended and obstruction clearing position.

References Cited
UNITED STATES PATENTS

| | | | |
|---|---|---|---|
| 1,306,383 | 6/1919 | Lindquist | 43—42.4 UX |
| 1,791,316 | 2/1931 | Jordan | 43—42.15 |
| 3,299,562 | 1/1967 | Bennecke | 43—42.45 X |
| 2,758,409 | 8/1956 | Eslinger | 43—42.15 |
| 2,455,155 | 11/1948 | Baima | 43—42.44 X |
| 2,585,783 | 2/1952 | Johnston | 43—42.44 X |
| 3,131,504 | 5/1964 | Haulk | 43—42.4 X |

SAMUEL KOREN, Primary Examiner

G. M. YAHWAK, Assistant Examiner

U.S. Cl. X.R.

43—42.15, 42.44